United States Patent

Hussain et al.

[19]

[11] Patent Number: 6,163,700
[45] Date of Patent: Dec. 19, 2000

[54] SYSTEM AND METHOD FOR ADAPTIVE RESERVATION OF RADIO RESOURCES FOR CELLS BELONGING TO LOCALIZED SERVICE AREA

[75] Inventors: Tahir Hussain, Dallas; Patrick Arabie, Plano; Bagher Rouhollahzadeh; Ranjit Bhatia, both of Dallas, all of Tex.

[73] Assignee: Ericsson Inc., Research Triangle Park, N.C.

[21] Appl. No.: 09/224,814

[22] Filed: Dec. 30, 1998

[51] Int. Cl.$^7$ ........................................... H04Q 7/20
[52] U.S. Cl. ........................ 455/453; 455/450; 455/452
[58] Field of Search ................................... 455/450, 451, 455/452, 453, 447, 518, 519

[56] References Cited

U.S. PATENT DOCUMENTS

| | | | |
|---|---|---|---|
| 4,551,852 | 11/1985 | Grauel et al. | 455/453 |
| 4,866,710 | 9/1989 | Schaeffer | 455/453 |
| 4,870,408 | 9/1989 | Zdunek et al. | 45555/450 |
| 5,574,977 | 11/1996 | Joseph et al. | 455/450 |
| 5,732,353 | 3/1998 | Haartsen | 455/450 |
| 5,778,320 | 7/1998 | Drozt et al. | 455/509 |
| 5,987,319 | 11/1999 | Hermansson et al. | 455/422 |
| 6,035,200 | 3/2000 | Rockert | 455/453 |
| 6,041,239 | 3/2000 | Reed et al. | 455/453 |
| 6,055,433 | 4/2000 | Yuan et al. | 455/453 |
| 6,055,437 | 4/2000 | Riley et al. | 455/511 |
| 6,070,052 | 6/2000 | Ogasawara et al. | 455/13.1 |

*Primary Examiner*—Nguyen Vo
*Assistant Examiner*—Duc Nguyen
*Attorney, Agent, or Firm*—Jenkens & Gilchrist, P.C.

[57] ABSTRACT

A telecommunications system and method is disclosed for providing adaptive reservation of radio resources within a Localized Service Area (LSA) in order to achieve more efficient channel utilization of radio resources within the LSA. During a predefined time period, a base station controller (BSC) within the LSA scans for the percentage of radio resources used by public mobile subscriber and LSA mobile subscribers. The BSC compares the scanned percentage of radio resources with a radio resource usage profile stored in the BSC. If the scanned radio resource usage differs from the radio resource usage profile, the BSC sets new radio resource reservations for LSA and public mobile subscribers and updates the radio resource usage profile with the new radio resource reservations. The process is repeated to ensure maximum efficient radio resource usage within the LSA.

32 Claims, 7 Drawing Sheets

6,163,700

1

SYSTEM AND METHOD FOR ADAPTIVE RESERVATION OF RADIO RESOURCES FOR CELLS BELONGING TO LOCALIZED SERVICE AREA

BACKGROUND OF THE PRESENT INVENTION

1. Field of the Invention

The present invention relates generally to telecommunications systems and methods for providing localized service area services, and specifically to providing efficient reservation and allocation of radio resources within a localized service area.

2. Background and Objects of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as wireless network 10, which in turn is composed of a plurality of areas 12, each with a Mobile Services Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or, alternatively, can service multiple MSCs 14, the latter of which is illustrated in FIG. 1.

The VLR 16 is a database containing information about all of the MSs 20 currently located within the MSC/VLR area 12. If an MS 20 roams into a new MSC/VLR area 12, the VLR 16 connected to that MSC 14 will request data about that MS 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

Within the GSM standards, there are features and capabilities defined which allow groups of subscribers to be managed according to a number of operator specific criteria, e.g., CAMEL or USSD. Future trends in GSM system platform development are geared towards customized system solutions to enhance radio access solutions to take into account, for example, indoor environments, such as micro and pico cells 22 within an office building.

One such customized solution is the Localized Service Area (LSA), which offers subscribers or groups of subscribers different service features, costs and access rights within a regionally restricted area or areas. The LSA concept is especially beneficial for businesses by allowing a company to provide cellular service to its employees while located within the building or buildings constituting the company.

As shown in FIG. 2 of the drawings, an LSA 250 can consist of a cell 22a or a number of cells 22a within one or more GSM PLMN's 10. LSA cells 22a can be implemented on top of existing GSM PLMN cells 22b, with coverage overlapping between LSA cells 22a and GSM cells 22b. In addition, the cells 22a constituting the LSA 250 may not necessarily provide continuous coverage.

In any cellular environment, an available radio resource guarantees the completion of a call. However, for cells 22a belonging to the LSA 250, a number of channels are typically reserved for LSA mobile subscribers, e.g., employees, in order to ensure that the LSA mobile subscribers can gain access to the LSA network 250. An Exclusive Access (EA) function provides exclusive access to radio resources only to mobile subscribers registered with the LSA 250. Thus, if an employee invites a business associate who is not registered with the LSA 250 into the office building, the business associate would not be able to access the LSA radio resources. The business associate would then only be able to make a wireless call if an overlapping GSM cell 22b provides coverage to the office building. However, with the EA function, the radio resources of the LSA 250 may not be efficiently utilized by the LSA mobile subscribers at all times. These situations are undesirable for many LSA 250 network operators.

Therefore, a Preferential Access (PA) function within the LSA 250 can be implemented to provide preference for radio resources to mobile subscribers that subscribe to the LSA 250, which ensures the availability of radio resources for the LSA mobile subscribers when needed. However, even in an LSA 250 having the PA function, these reserved channels may not be efficiently used by the LSA mobile subscribers.

For example, an inefficiency can arise if the LSA 250 has reserved twenty percent of the available radio resources for registered LSA mobile subscribers, and only five percent of the reserved radio resources are being used by registered LSA mobile subscribers. If the entire eighty percent of unreserved radio resources are being used by non-registered mobile subscribers (hereinafter referred to as public mobile subscribers), if one more public mobile subscriber attempts to access the LSA network 250, the public mobile subscriber will not be allowed access, even though fifteen percent of the radio resources are still available.

As another example, an inefficiency can arise in the opposite situation, in which the entire twenty percent of available radio resources that have been reserved for registered LSA mobile subscribers are being utilized by the LSA mobile subscribers. If a registered LSA mobile subscriber then attempts to access the LSA network 250, the registered LSA mobile subscriber may not be allowed access to the LSA network 250 because the LSA mobile subscriber will be competing with other public mobile subscribers to gain access to the LSA network 250. This is also undesirable for the LSA 250 network operator and the registered LSA mobile subscriber, because LSA's 250 are typically created to provide specific cellular services and features for the registered LSA mobile subscribers.

It is, therefore, an object of the present invention to provide an adaptive reservation of radio resources within an LSA in order to achieve efficient channel allocation and utilization of radio resources.

SUMMARY OF THE INVENTION

The present invention is directed to telecommunications systems and methods for providing adaptive reservation of radio resources within a Localized Service Area (LSA) in order to achieve more efficient channel utilization of radio resources within the LSA. During a predefined time period, a Base Station Controller (BSC) within the LSA scans for the percentage of radio resources used by public mobile subscribers and LSA mobile subscribers. The BSC compares the scanned percentage of radio resources with a resource usage profile stored in the BSC. If the scanned radio resource usage differs from the resource usage profile, the BSC sets a new radio resource reservation percentage for LSA mobile subscribers and updates the resource usage profile with the new radio resource reservation percentage. The process is repeated to ensure maximum efficient radio resource usage within the LSA. Alternatively, the BSC can scan for the combined percentage of radio resources used by both public and LSA mobile subscribers in addition to the percentage used individually. When the total combined percentage reaches a threshold percentage, the BSC compares the percentage of the two mobile subscriber groups and redistributes the unused resources, with preference to the mobile subscriber group with the most usage.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
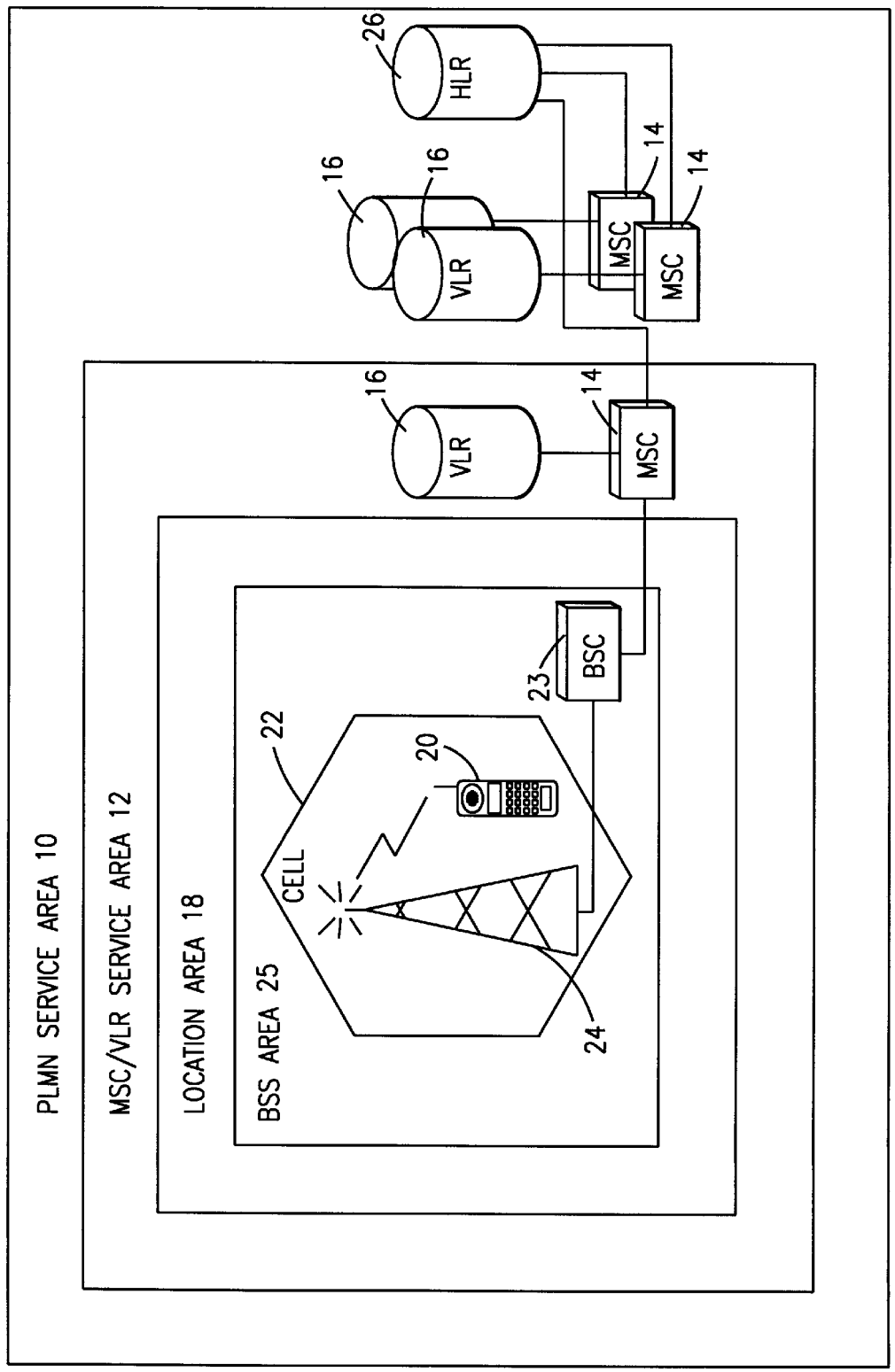
FIG. 1 is a block diagram of a conventional wireless telecommunications system.
Figure 2:
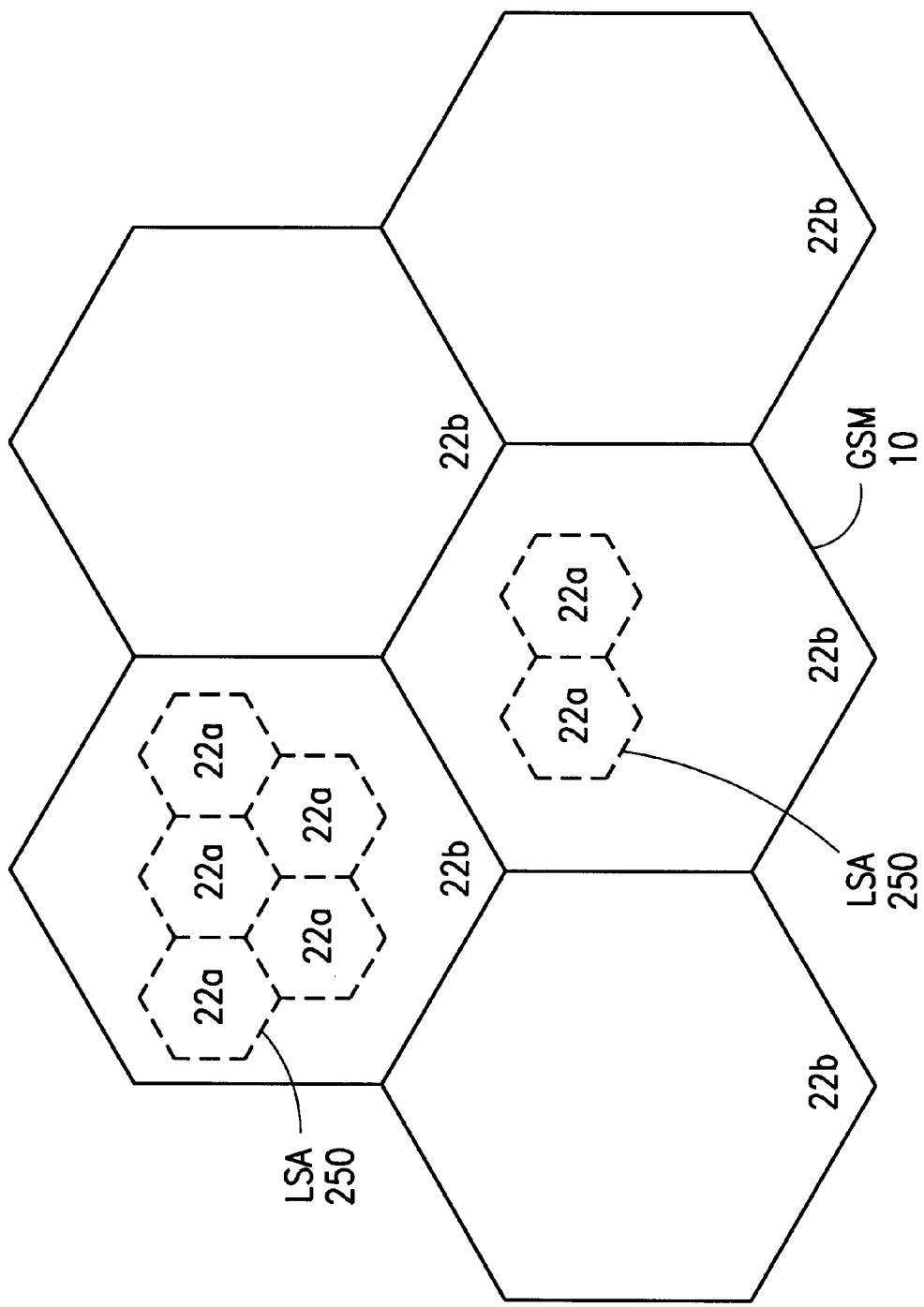
FIG. 2 illustrates a conventional Localized Service Area in which cells belonging to an overlapping cellular network overlap cells belonging to the Localized Service Area.
Figure 3:
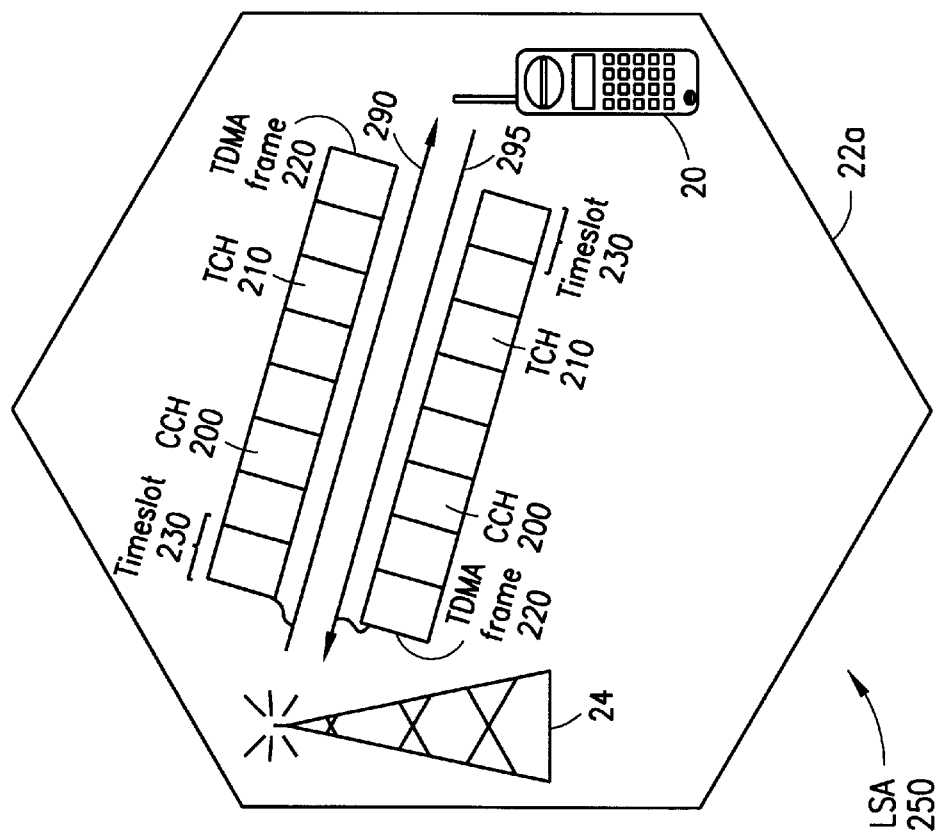
FIG. 3 illustrates the conventional utilization of timeslots within Time Division Multiple Access (TDMA)-frames between a Base Transceiver Station and a Mobile Station within a cell.

With reference now to FIG. 3 of the drawings, utilization of radio resources, i.e. traffic channels (TCH) 210, within a Localized Service Area (LSA) 250, which includes at least one cell 22a, is similar to the allocation of traffic channels within any network. A traffic channel (TCH) 210 is a logical channel for transmitting speech that is mapped onto a physical channel or timeslot 230 within a Time Division Multiple Access (TDMA)-frame 220. One TDMA-frame 220 is associated with one carrier frequency, and, within a GSM system, one TDMA-frame 220 consists of eight timeslots 230 or physical channels. Thus, speech can potentially be transmitted by eight different Mobile Stations (MSs) 20 on eight different timeslots 230 of one carrier frequency 220.

However, in order to avoid co-channel and adjacent channel interference between cells 22a, re-usage of the same frequency 220 by different cells 22a must be limited to those cells 22a separated by a sufficient distance. In addition, of the available frequencies 220 per cell 22a, some of the frequencies 220 can only be used on a downlink channel 290 from a Base Transceiver Station (BTS) 24 to a Mobile Station (MS) 20, while other frequencies 220 can only be used on an uplink channel 295 from the MS 20 to the BTS 24. Furthermore, in addition to speech, user data and control signaling information must be transmitted on control channels (CCH) 200, which are mapped onto the logical channels or timeslots 230 of a TDMA-frame 220. Therefore, since each cell 22a cannot utilize all available carrier frequencies 220, and since user data and control signaling must also be transmitted on timeslots 230 of carrier frequencies 220, the amount of radio resources 210 available for traffic channels 210 per cell 22a is limited.

When a portion of this limited pool of radio resources 210 is reserved to a certain group of subscribers, such as LSA mobile subscribers within the LSA 250, if the LSA mobile subscribers do not use all of the reserved radio resources 210, this produces an inefficiency in radio resource 210 utilization. Furthermore, if the LSA mobile subscribers use more than the reserved radio resources 210, the LSA 250 network operator cannot ensure that the LSA mobile subscribers can gain access to the LSA network 250 because the LSA mobile subscribers will be competing with public mobile subscribers.

Thus, in order to efficiently utilize the limited radio resources 210 within an LSA 250 having both public and LSA mobile subscribers, while ensuring the availability of radio resources 210 to LSA mobile subscribers, an adaptive method of reserving radio resources 210 to LSA mobile subscribers is needed.

Figure 4:
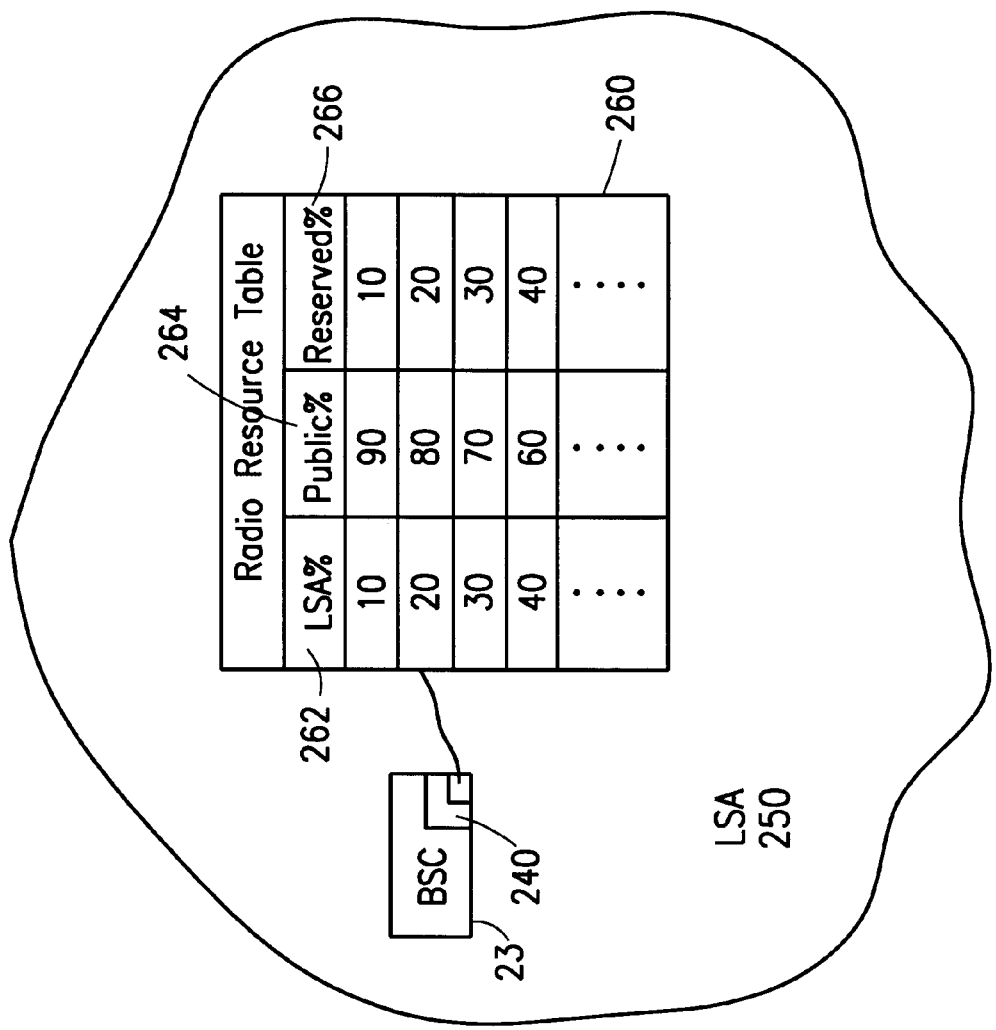
FIG. 4 illustrates a radio resource table stored within a Base Station Controller within a Localized Service Area in accordance with preferred embodiments of the present invention.

For example, as shown in FIG. 4 of the drawings, a Base Station Controller (BSC) 23 within an LSA 250 can store a radio resource table 260 established by the LSA 250 network operator within a memory 240 therein. The table 260 has a list of radio resource usage percentages for LSA mobile subscribers 262 and an associated reservation percentage 266 for LSA mobile subscribers. In preferred embodiments, the table 260 also includes a list of radio resource usage percentages for public mobile subscribers 264. As an example, if the percentage of radio resources used by LSA mobile subscribers 262 is ten percent, and the percentage of radio resources used by public mobile subscribers 264 is ninety percent, the percentage of radio resources reserved to only LSA mobile subscribers 266 is ten percent.

It should be understood that the table 260 shown in FIG. 4 of the drawings assumes nearly one-hundred percent utilization of radio resources by both LSA and public mobile subscribers. In LSA networks 250 having less than one-hundred percent utilization of radio resources, the table 260 may only include the list of radio resource usage percentages by LSA mobile subscribers 262 and the associated reservation percentages 266, because the percentage used by LSA mobile subscribers 262 typically determines the reservation percentage 266.

Alternatively, the table 260 can include a range of possibilities of the combinations of percentages or every possibility of the combinations of percentages utilized by both LSA 262 and public mobile subscribers 264, along with the associated reservation percentages 266. For example, if the percentage of radio resources used by LSA mobile subscribers 262 is ten percent, and the percentage of radio resources used by public mobile subscribers 264 is also ten percent of the available radio resources, the percentage reserved to LSA mobile subscribers 266 can be set arbitrarily by the LSA 250 network operator between zero and ninety percent of the available radio resources. However, if the percentage of radio resources used by LSA mobile subscribers 262 is ten percent, and the percentage of radio resources used by public mobile subscribers 264 is ninety percent of the available radio resources, the percentage reserved to LSA mobile subscribers 266 must be set to ten percent to ensure maximum efficient utilization of radio resources. It should be understood that the reservation percentages can be set by the network operator based upon the associated LSA and public usage percentages.

Figure 5:
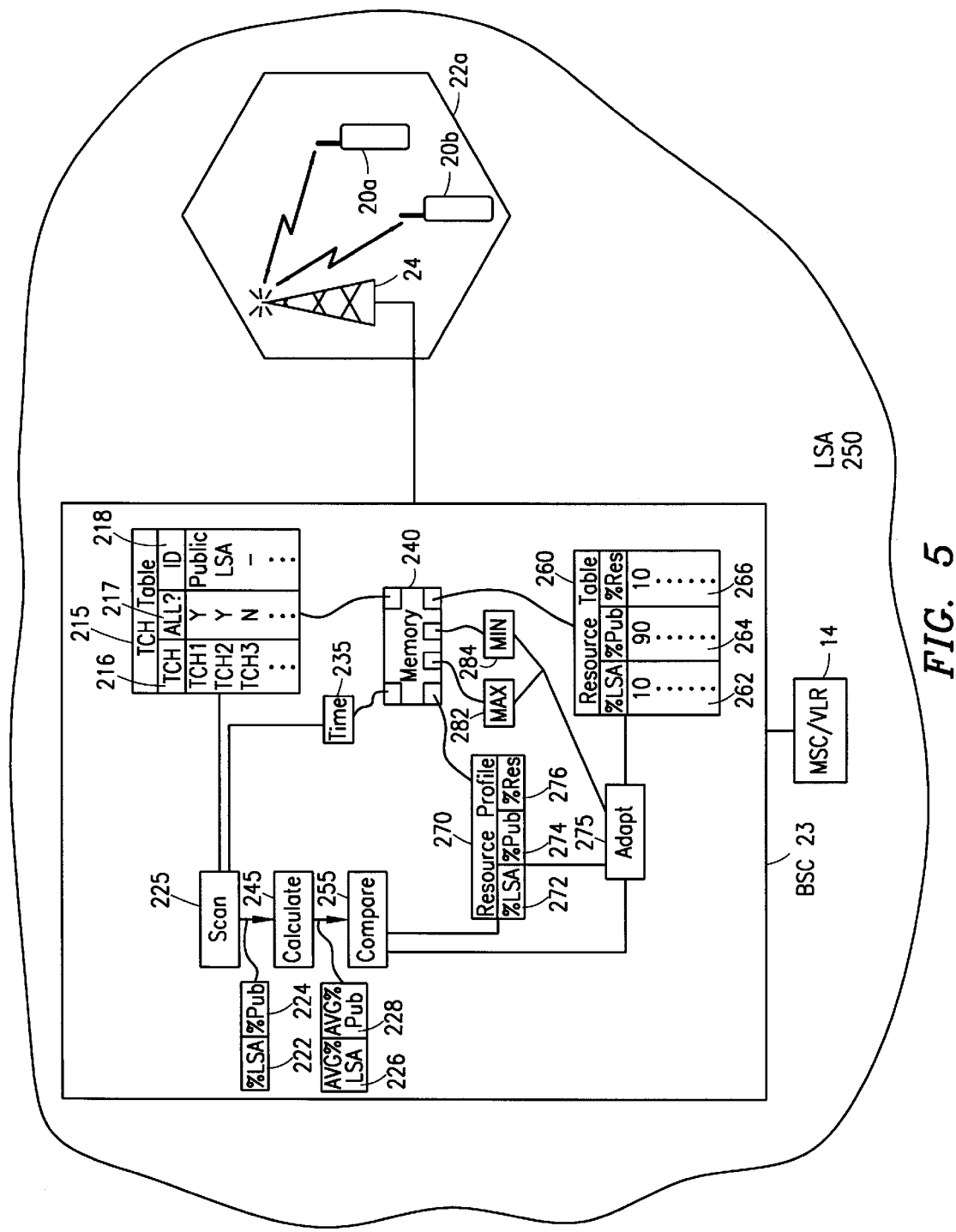
FIG. 5 illustrates the adaptive reservation of radio resources to Localized Service Area mobile subscribers in accordance with preferred embodiments of the present invention.
Figure 6:
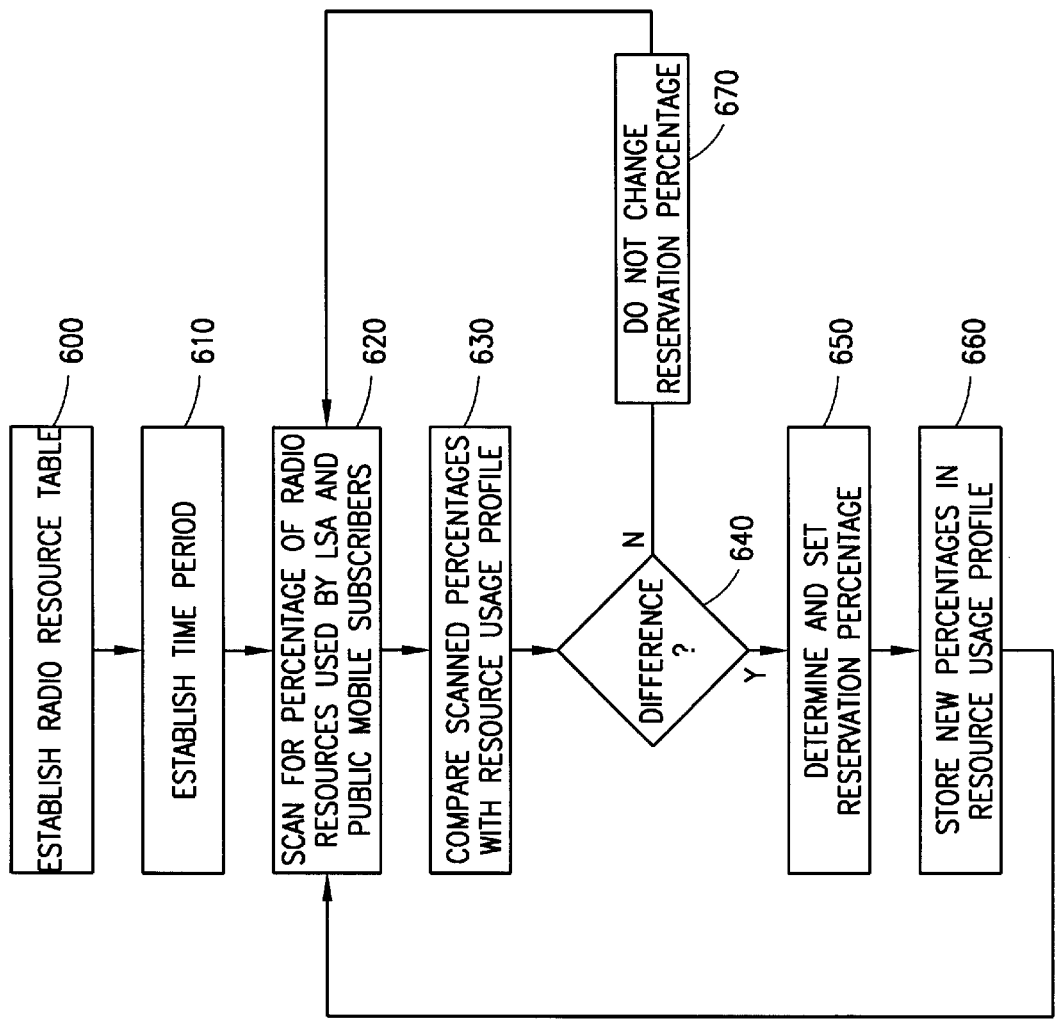
FIG. 6 illustrates steps in the adaptive reservation process shown in FIG. 5.

With reference now to FIG. 5, which will be described in connection with the steps shown in FIG. 6 of the drawings, once the table 260 shown in FIG. 4 of the drawings is established (step 600) to adaptively set the percentage of radio resources reserved for LSA mobile subscribers in order to provide preferential access for LSA mobile subscribers, the LSA 250 network operator can set a predefined time period 235 (step 610) for scanning the percentage of radio resources used by both the public mobile subscribers 20b and the LSA mobile subscribers 20a. The LSA 250 network operator can also optionally set a maximum 282 and minimum 284 percentage of radio resources that can be reserved to LSA mobile subscribers 20a, e.g., at least ten percent must be reserved for LSA subscribers 20a, but no more than ninety percent can be reserved for LSA subscribers 20a. Alternatively, the reservation percentage can range between zero and one-hundred percent of the available radio resources.

During the predefined time period 235 stored within the BSC, scanning logic 225 within the BSC 23 scans for the percentage of radio resources used by both the public mobile subscribers 224 and the LSA mobile subscribers 222 (step 620) within a cell 22a served by a Base Transceiver Station (BTS) 24 associated with the BSC 23. The percentage of radio resources used by the public 224 and LSA 222 mobile subscribers is known by the BSC 23 because a Mobile Switching Center/Visitor Location Register (MSC/VLR) 14 serving the BSC 23 provides this identity information (LSA or public) of the MS's 20a or 20b when the MSC/VLR 14 instructs the BSC 23 to allocate the MS's 20a and 20b a traffic channel.

Alternatively, in preferred embodiments, and as shown in FIG. 5, when the MSC/VLR 14 instructs the BSC 23 to allocate a traffic channel for an MS 20a or 20b, the MSC/VLR 14 can send the identity 218 (LSA or public) of the MS 20a or 20b to the BSC 23 for storage by the BSC 23 in the memory 240 therein. For example, the BSC 23 can store a traffic channel table 215 having a list 216 of available traffic channels, an indication 217 of whether or not each traffic channel has been allocated, and if a traffic channel has been allocate, a designation 218 of whether the traffic channel is being used by a public 20b or LSA 20a mobile subscriber. The BSC 23 can then scan this list 216 of traffic channels for the predefined time period 235, and calculation logic 245 within the BSC 23 can calculate an average percentage of traffic channels utilized by LSA mobile subscribers 226 and an average percentage of traffic channels utilized by public mobile subscribers 228.

Once the BSC 23 calculates the average percentages 226 and 228 of radio resources utilized by public 20b and LSA 20a mobile subscribers (step 620), comparison logic 255 within the BSC 23 can compare the average percentages 226 and 228 with a resource usage profile 270 stored in the BSC 23 (step 630). The resource usage profile 270 includes the last calculated percentage of radio resources utilized by LSA mobile subscribers 272, the last calculated percentage of radio resources utilized by public mobile subscribers 274 and the last determined associated reservation percentage 276. If the average calculated percentages 226 and 228 differ from the last calculated percentages 272 and 274 within the resource usage profile 270 (step 640), adaptation logic 275 within the BSC 23 determines and sets the new reservation percentage 276 using the radio resource table 260 stored within the BSC 23 (step 650), replaces the last calculated percentages 272 and 274 within the resource usage profile 270 with the new calculated percentages 266 and 268, respectively, and stores this new reservation percentage 276 in the resource usage profile 270 (step 660). This is accomplished by finding corresponding calculated percentages 272 and 274 within the radio resource table 260, and using the reservation percentage 276 associated with the corresponding calculated percentages 272 and 274. The process then continues with the BSC 23 scanning the percentages 222 and 224 again for the predetermined time period 235 (step 620).

However, if the new calculated percentages 226 and 228 do not differ from the last calculated percentages 272 and 274, respectively, within the resource usage profile 270 (step 640), the adaptation logic 275 does not change the reservation percentage 276 (step 670). In addition, the LSA 250 network operator can program the comparison logic 255 to allow for minimal percentage differences between the new calculated percentages 266 and 268 and the last calculated percentages 272 and 274, respectively, within the resource usage profile 270. For example, if the new calculated percentages 266 and 268 only differ +/- five percent from the last calculated percentages 272 and 274, respectively, within the resource usage profile 270, the adaptation logic 275 does not change the reservation percentage 276, and the BSC 23 continues to scan the radio resource usage per LSA 222 and public 224 mobile subscribers (step 620).

The BSC 23 can perform this process for each cell 22a belonging to the BSC 23. The radio resource table 260 can be set per cell 22a or per LSA 250. If the radio resource table 260 is set per LSA 250, the radio resource table 260 would be utilized to set the reservation percentage 276 for each resource usage profile 270 for each cell 22a.

Figure 7:
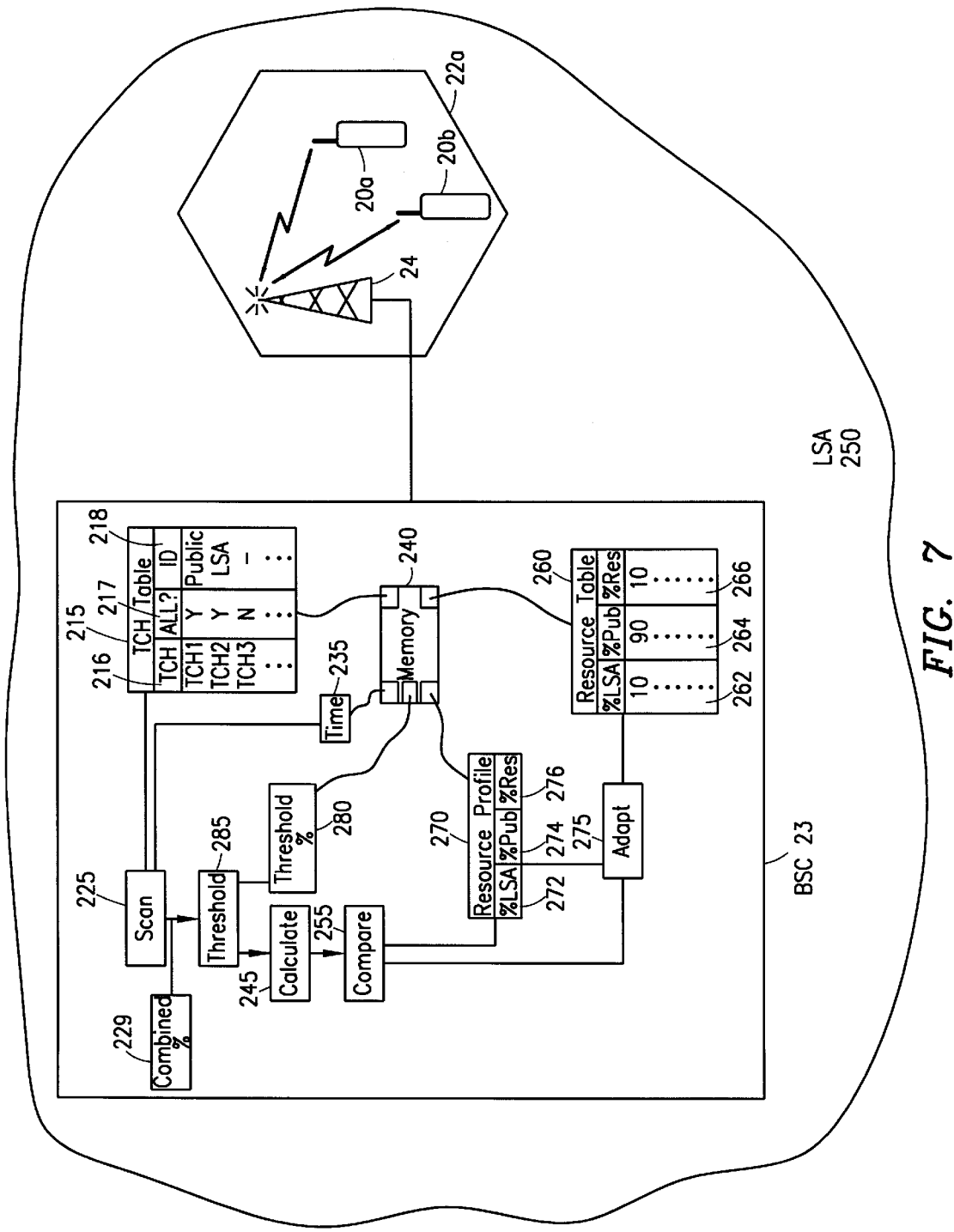
FIG. 7 illustrates the adaptive reservation of radio resources to Localized Service Area mobile subscribers based upon a threshold percentage in accordance with alternative embodiments of the present invention.

In an alternative embodiment of the present invention, as illustrated in FIG. 7 of the drawings, the scanning logic 225 within the BSC 23 can scan for the percentage of radio resources used by public mobile subscribers 222 and LSA mobile subscribers 224, and can also scan for the combined percentage of radio resources being used by both public and LSA mobile subscribers 229 during the predefined time period 235. A threshold percentage 280 can be defined and stored within the memory 240 within the BSC 23. When threshold logic 285 within the BSC 23 determines that the total combined percentage 229 has reached the threshold percentage 280, the comparison logic 255 within the BSC 23 compares the calculated percentages 226 and 228 of radio resource usage by the two mobile subscriber groups (LSA 20a and public 20b), and the adaptation logic 275 redistributes the unused resources, with preference to the mobile subscriber group 20a or 20b with the most usage.

The adaptation logic 275 can use the radio resource table 260 to set the reservation percentage 276, or the adaptation logic 275 can set the reservation percentage 276 using another method programmed by the LSA 250 network operator. The resource usage profile 270 can also be used in this embodiment along with the threshold percentage 280. However, the resource usage profile 270 would only be used by the comparison logic 255 when the threshold percentage 280 has been reached.

By adaptively setting the reservation percentage 276 for LSA mobile subscribers 20a, more efficient utilization of the radio resources in an LSA network 250 can occur. Thus, the LSA 250 network operator can ensure that more calls are completed in the LSA 250, which generates more revenue for the LSA 250 network operator, without reducing the availability of radio resources to LSA subscribers 20a.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications node within a localized service area having a plurality of radio resources associated therewith, comprising:

a memory for storing a predetermined time period and an adjustable reservation percentage of said radio resources for localized service area mobile subscribers;

means for scanning available radio resources to determine a percentage of said radio resources utilized by localized service area mobile subscribers and a percentage of said radio resources utilized by public mobile subscribers during said predetermined time period;

means for performing a comparison of said scanned percentage of said radio resources utilized by localized service area mobile subscribers and said scanned percentage of said radio resources utilized by public mobile subscribers; and means for establishing said reservation percentage based upon said comparison.

2. The telecommunications node of claim 1, further comprising a resource usage profile stored in said memory comprising a stored percentage of said radio resources utilized by localized service area mobile subscribers, a stored percentage of said radio resources utilized by public mobile subscribers and said reservation percentage from a previously measured time period.

3. The telecommunications node of claim 2, wherein said means for performing said comparison further comprises:

means for comparing said scanned percentage of said radio resources utilized by localized service area mobile subscribers with said stored percentage of said radio resources utilized by localized service area mobile subscribers to determine if they are equal, and for comparing said scanned percentage of said radio resources utilized by public mobile subscribers with said stored percentage of said radio resources utilized by public mobile subscribers to determine if they are equal.

4. The telecommunications node of claim 3, further comprising:

means for replacing said stored percentage of said radio resources utilized by public mobile subscribers with said scanned percentage of said radio resources utilized by public mobile subscribers if said scanned percentage of radio resources utilized by public mobile subscribers is not equal to said stored percentage of radio resources utilized by public mobile subscribers, and for replacing said stored percentage of said radio resources utilized by localized service area mobile subscribers with said scanned percentage of radio resources utilized by localized service area mobile subscribers if said scanned percentage of said radio resources utilized by localized service area mobile subscribers is not equal to said stored percentage of radio resources utilized by localized service area mobile subscribers.

5. The telecommunications node of claim 1, further comprising a radio resource table stored within said memory comprising a list of potential percentages of said radio resources utilized by localized service area mobile subscribers, each said potential percentage having a required reservation percentage associated therewith.

6. The telecommunications node of claim 5, wherein said means for establishing said reservation percentage further comprises:

means for establishing said reservation percentage as said required reservation percentage associated with said potential percentage that substantially corresponds to said scanned percentage of said radio resources utilized by localized service area mobile subscribers.

7. The telecommunications node of claim 6, wherein said radio resource table further comprises a list of potential percentages of said radio resources utilized by said public mobile subscribers.

8. The telecommunications node of claim 7, wherein said means for establishing said reservation percentage further comprising:

means for establishing said reservation percentage as said required reservation percentage associated with said potential percentage that substantially corresponds to said scanned percentage of said radio resources utilized by localized service area mobile subscribers and said potential percentage that substantially corresponds to said scanned percentage of said radio resources utilized by public mobile subscribers.

9. The telecommunications node of claim 1, further comprising a maximum reservation percentage and a minimum reservation percentage stored within said memory, said established reservation percentage being between said maximum reservation percentage and said minimum reservation percentage.

10. The telecommunications node of claim 1, further comprising a traffic channel table stored within said memory comprising a list of allocated traffic channels, each said allocated traffic channel having a designation associated therewith.

11. The telecommunications node of claim 10, wherein said means for scanning for said percentage of said radio resources utilized by localized service area mobile subscribers further comprises:
    means for scanning said traffic channel table for select ones of said allocated traffic channels that have said designation set to localized service area.

12. The telecommunications node of claim 10, wherein said means for scanning for said percentage of said radio resources utilized by public mobile subscribers further comprises:
    means for scanning said traffic channel table for select ones of said allocated traffic channels that have said designation set to public.

13. The telecommunications node of claim 1, further comprising:
    a threshold percentage stored within said memory;
    means for scanning for a combined percentage of said radio resources utilized by both public mobile subscribers and localized service area mobile subscribers to determine if said threshold percentage is exceeded; and
    means for comparing said combined percentage with said threshold percentage, said comparison of said percentages of said radio resources utilized by said public mobile subscribers and said localized service area mobile subscribers being performed when said combined percentage exceeds said threshold percentage.

14. The telecommunications node of claim 1, wherein said telecommunications node is a base station controller.

15. A localized service area for providing adaptive reservation of radio resources associated with at least one base transceiver station to localized service area mobile subscribers, comprising:
    at least one cell served by said at least one base transceiver station, said at least one cell having localized service area mobile subscribers and public mobile subscribers located therein; and
    a base station controller serving said cell, said base station controller comprising:
        a memory for storing a predetermined time period and a reservation percentage of said radio resources for said localized service area mobile subscribers,
        means for scanning for a percentage of said radio resources utilized by said localized service area mobile subscribers and a percentage of said radio resources utilized by said public mobile subscribers for said predetermined time period,
        means for performing a comparison of said scanned percentage of said radio resources utilized by said localized service area mobile subscribers and said scanned percentage of said radio resources utilized by said public mobile subscribers, and
        means for establishing said reservation percentage based upon said comparison.

16. The localized service area of claim 15, wherein said base station controller further comprises a resource usage profile stored in said memory comprising a stored percentage of said radio resources utilized by said localized service area mobile subscribers, a stored percentage of said radio resources utilized by said public mobile subscribers and said reservation percentage from a previously measured time period.

17. The localized service area of claim 16, wherein said means for performing said comparison further comprises:
    means for comparing said scanned percentage of said radio resources utilized by said localized service area mobile subscribers with said stored percentage of said radio resources utilized by said localized service area mobile subscribers to determine if they are equal, and for comparing said scanned percentage of said radio resources utilized by said public mobile subscribers with said stored percentage of said radio resources utilized by said public mobile subscribers to determine if they are equal.

18. The localized service area of claim 16, further comprising:
    an additional cell served by an additional base transceiver station, said additional cell having additional localized service area mobile subscribers and additional public mobile subscribers located therein, said base station controller having an additional reservation percentage and an additional resource usage profile associated with said additional cell stored in said memory therein.

19. The localized service area of claim 15, wherein said base station controller further comprises a radio resource table stored within said memory comprising a list of potential percentages of said radio resources utilized by said localized service area mobile subscribers, each said potential percentage having a required reservation percentage associated therewith.

20. The localized service area of claim 19, wherein said means for establishing said reservation percentage further comprises:
    means for establishing said reservation percentage as said required reservation percentage associated with said potential percentage that substantially corresponds to said scanned percentage of said radio resources utilized by said localized service area mobile subscribers.

21. The localized service area of claim 15, wherein said base station controller further comprises a traffic channel table stored within said memory comprising a list of allocated traffic channels, each said allocated traffic channel having a designation associated therewith.

22. The localized service area of claim 21, wherein said means for scanning for said percentage of said radio resources utilized by said localized service area mobile subscribers further comprises:
    means for scanning said traffic channel table for select ones of said allocated traffic channels that have said designation set to localized service area.

23. The localized service area of claim 21, wherein said means for scanning for said percentage of said radio resources utilized by said public mobile subscribers further comprises:
    means for scanning said traffic channel table for select ones of said allocated traffic channels that have said designation set to public.

24. The localized service area of claim 15, wherein said base station controller further comprises:
    a threshold percentage stored within said memory;
    means for scanning for a combined percentage of said radio resources utilized by both said public mobile subscribers and said localized service area mobile subscribers to determine if said threshold percentage is exceeded; and
    means for comparing said combined percentage with said threshold percentage, said comparison of said percentages of said radio resources utilized by said public mobile subscribers and said localized service area mobile subscribers being performed when said combined percentage exceeds said threshold percentage.

25. A method for providing adaptive reservation of radio resources to localized service area mobile subscribers within a localized service area, comprising the steps of:

storing a predetermined time period and a reservation percentage of said radio resources for localized service area mobile subscribers in a base station controller within said localized service area;

scanning, by said base station controller, for a percentage of said radio resources utilized by localized service area mobile subscribers and a percentage of said radio resources utilized by public mobile subscribers for said predetermined time period;

performing, by said base station controller, a comparison of said scanned percentage of said radio resources utilized by localized service area mobile subscribers and said scanned percentage of said radio resources utilized by public mobile subscribers; and establishing, by said base station controller, said reservation percentage based upon said comparison.

26. The method of claim 25, wherein said step of performing said comparison further comprises the steps of:

comparing said scanned percentage of said radio resources utilized by localized service area mobile subscribers with a stored percentage of said radio resources utilized by localized service area mobile subscribers stored in a resource usage profile in said base station controller; and comparing said scanned percentage of said radio resources utilized by public mobile subscribers with a stored percentage of said radio resources utilized by public mobile subscribers stored in said resource usage profile.

27. The method of claim 26, further comprising the steps of:

replacing said stored percentage of said radio resources utilized by public mobile subscribers with said scanned percentage of said radio resources utilized by public mobile subscribers; and replacing said stored percentage of said radio resources utilized by localized service area mobile subscribers.

28. The method of claim 25, wherein said step of establishing said reservation percentage further comprises the steps of:

accessing a radio resource table having a list of potential percentages of said radio resources utilized by localized service area mobile subscribers, each said potential percentage having a required reservation percentage associated therewith; and establishing said reservation percentage as said required reservation percentage associated with said potential percentage that substantially corresponds to said scanned percentage of said radio resources utilized by localized service area mobile subscribers.

29. The method of claim 28, wherein said step of establishing said reservation percentage further comprises the steps of:

accessing a list of potential percentages of said radio resources utilized by said public mobile subscribers within said radio resource table; and establishing said reservation percentage as said required reservation percentage associated with said potential percentage that substantially corresponds to said scanned percentage of said radio resources utilized by localized service area mobile subscribers and said potential percentage that substantially corresponds to said scanned percentage of said radio resources utilized by public mobile subscribers.

30. The method of claim 25, wherein said step of scanning for said percentage of said radio resources utilized by localized service area mobile subscribers further comprises the step of:

scanning a traffic channel table stored within said base station controller for select ones of allocated traffic channels within said traffic channel table that have a designation set to localized service area.

31. The method of claim 30, wherein said step of scanning for said percentage of said radio resources utilized by public mobile subscribers further comprises the step of:

scanning said traffic channel table for select ones of said allocated traffic channels that have said designation set to public.

32. The method of claim 25, wherein said step of performing further comprises the steps of:

scanning for a combined percentage of said radio resources utilized by both public mobile subscribers and localized service area mobile subscribers;

comparing said combined percentage with a threshold percentage stored within said base station controller; and performing said comparison of said percentages of said radio resources utilized by said public mobile subscribers and said localized service area mobile subscribers being performed when said combined percentage exceeds said threshold percentage.

* * * * *